No. 757,379. PATENTED APR. 12, 1904.
W. O. & J. D. WORTH.
FRICTIONAL POWER TRANSMITTING DEVICE.
APPLICATION FILED DEC. 30, 1903.
NO MODEL. 3 SHEETS—SHEET 2.
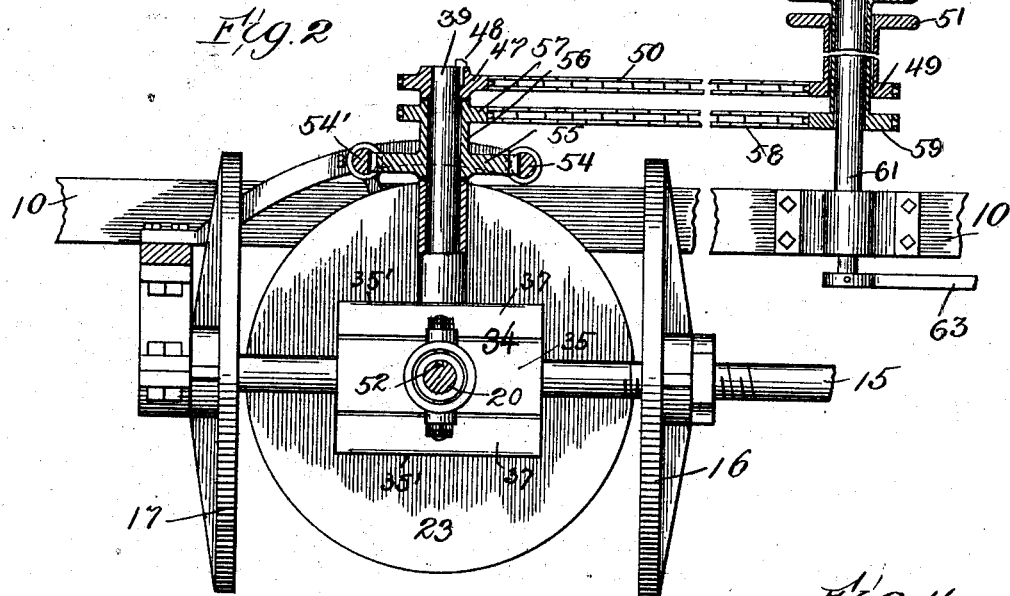
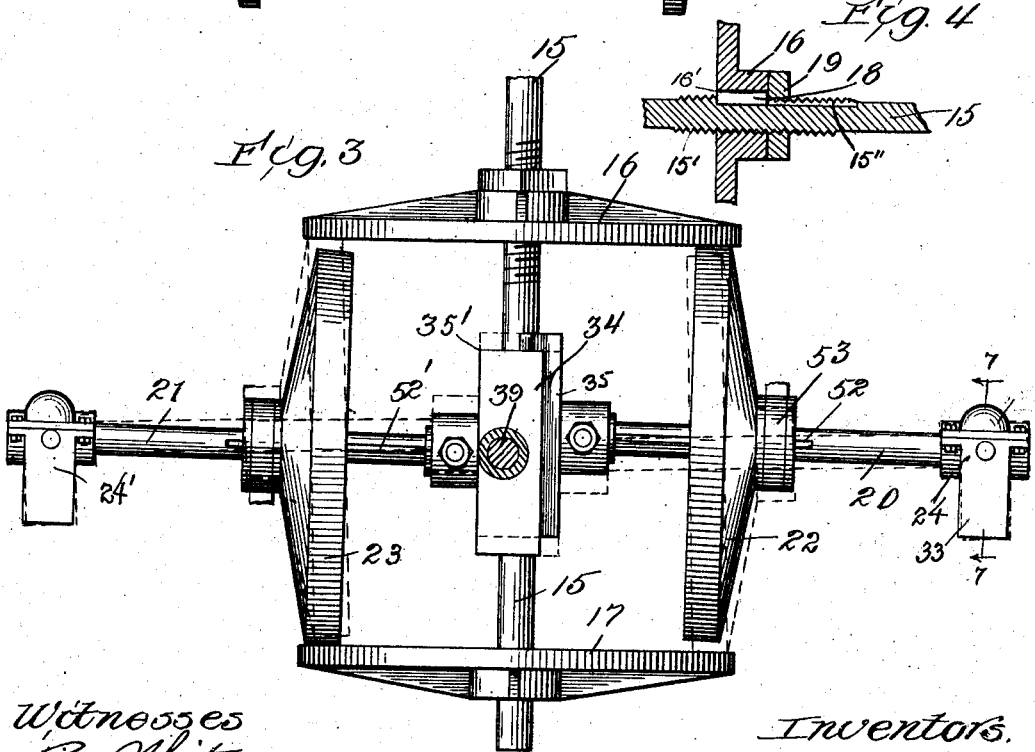
Witnesses
Ray White
Harry B. Leville
Inventors
William O. Worth,
John D. Worth,
By Foree Bain Atty.

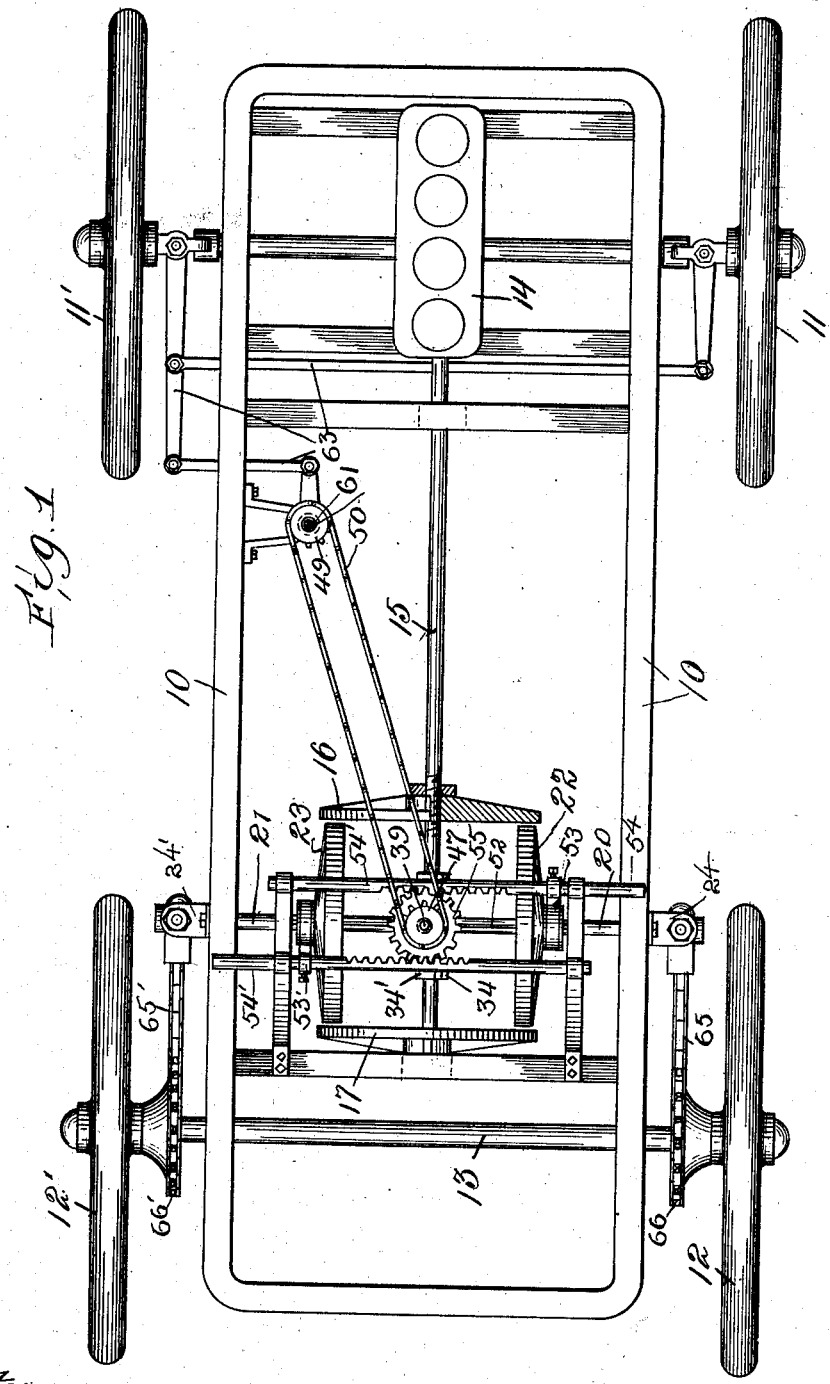

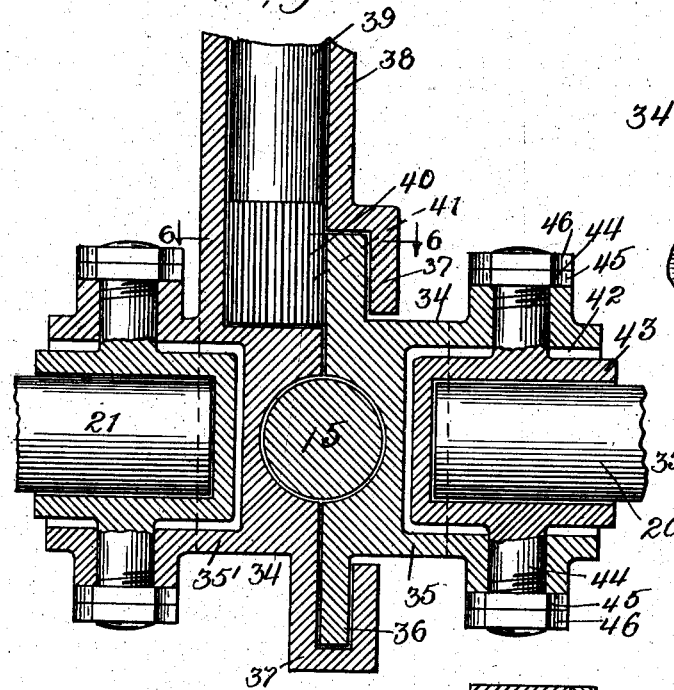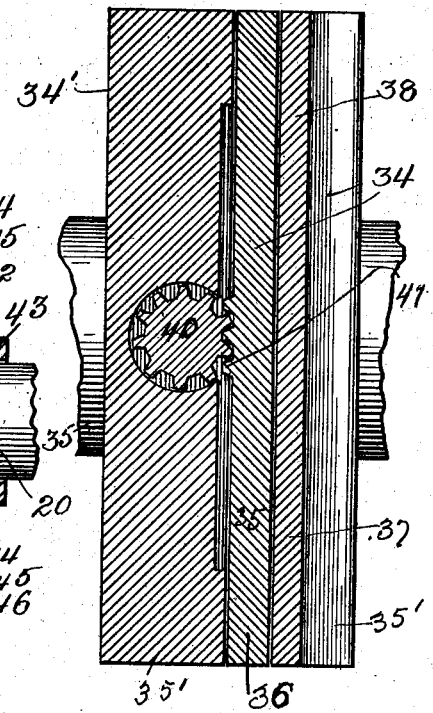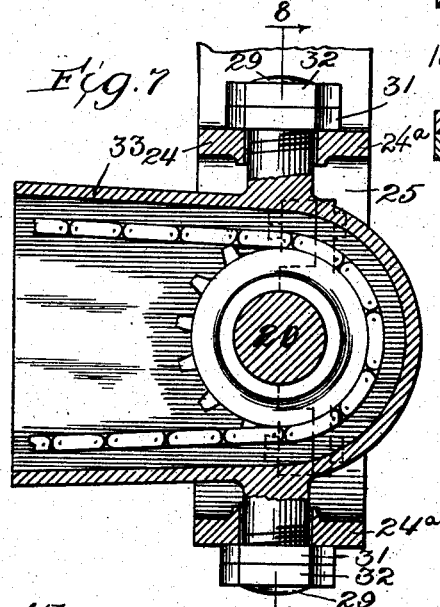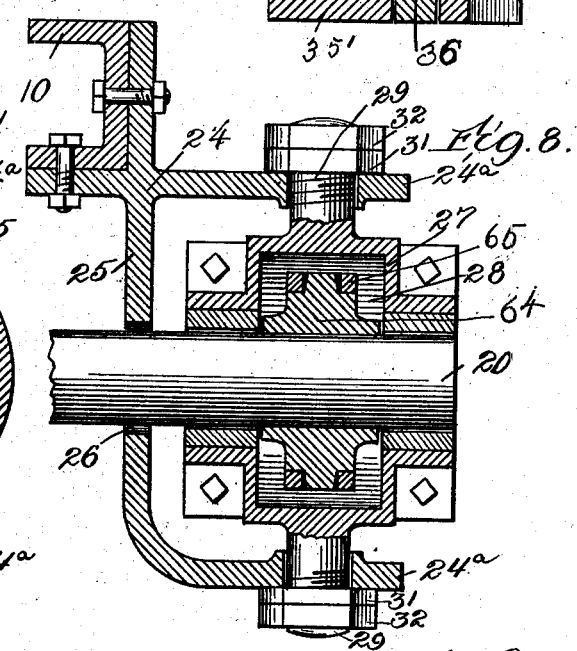

No. 757,379. Patented April 12, 1904.

UNITED STATES PATENT OFFICE.

WILLIAM O. WORTH AND JOHN D. WORTH, OF CHICAGO, ILLINOIS.

FRICTIONAL POWER-TRANSMITTING DEVICE.

SPECIFICATION forming part of Letters Patent No. 757,379, dated April 12, 1904.

Application filed December 30, 1903. Serial No. 187,097. (No model.)

*To all whom it may concern:*

Be it known that we, WILLIAM O. WORTH and JOHN D. WORTH, both of Chicago, in the county of Cook and State of Illinois, have invented certain new and useful Improvements in Frictional Power-Transmitting Devices; and we hereby declare that the following is a full, clear, and exact description thereof, reference being had to the accompanying drawings, which form part of this specification.

Our invention relates to frictional power-transmission devices, and has for one of its objects to provide a transmission device adapted to transmit motion from a driving-shaft to two independent driven shafts to simultaneously rotate them in the same direction.

A further object of our invention is to provide a device of the character described wherein the driving-shaft is uninterrupted and is bodily stationary—that is to say, wherein said driving-shaft has no movement whatever save its rotative movement in its relatively fixed bearings.

Another object of our invention is to so arrange the driving and driven mechanisms as to provide a device of the character described wherein neither the driving nor the driven shafts are subjected to end thrust; and a further object of our invention is to provide a generally-improved and highly-efficient frictional power-transmission device of the character specified.

With a view to attaining these and other objects, which will be apparent to those skilled in the art from the following description, our invention consists in a device comprising a bodily-stationary driving-shaft arranged to receive rotary motion from some prime mover, such as an engine, and provided with two confronting driving friction-disks, two approximately coaxial independent driven shafts, each provided with a friction-wheel associated with the driving members, and means for bodily moving said driven shafts simultaneously in opposite directions to bring the opposite driven wheels into peripheral contact with the opposite driving-disks.

Our invention further consists in certain new and improved means for effecting such simultaneous bodily movement of the opposing driven shafts.

Our invention further consists in certain new and improved means for centering the driven shafts in a common plane with the driving-shaft; and our invention further consists in the new and advantageous features of construction and arrangement of parts more fully hereinafter brought out and specified in the claims.

In the drawings, wherein we have illustrated an operative form of our invention as embodied in a power-transmitting device for automobiles, Figure 1 is a plan view of the chassis of an automobile equipped with a power-transmitting device embodying our invention. Fig. 2 is an enlarged vertical section in a plane generally longitudinal to the frame, showing parts in elevation. Fig. 3 is a plan view of the transmission mechanism enlarged and detached, parts being shown in section. Fig. 4 is a detail of the connection of a driving-disk to its shaft. Fig. 5 is an enlarged transverse vertical section taken through the driven-shaft-moving mechanism. Fig. 6 is a longitudinal section on line 6 6 of Fig. 5. Fig. 7 is an enlarged sectional detail taken on line 7 7 of Fig. 3. Fig. 8 is a transverse section on line 8 8 of Fig. 7.

Throughout the drawings like numerals of reference refer always to like parts.

Referring now to the drawings, 10 indicates generally a frame of an automobile, 11 11' its steering-wheels, and 12 12' its driving-wheels, the latter being mounted for independent rotation upon a common axle 13, suitably supported in the frame.

14 indicates a prime mover, such as a vertical four-cylinder engine, suitably mounted in the frame 10 and arranged to impart rotation to a longitudinally-extending driving-shaft 15.

16 and 17 are two driving friction-disks arranged in face-to-face confronting relation and at suitably-separated points upon the driving-shaft 15. One of said disks is preferably arranged for adjustment upon said shaft, the means which we prefer to employ for securing such adjustment being best illustrated in detail in Fig. 4, wherein 15' indicates a thread formed upon the shaft 15 for engagement of a corresponding thread upon the friction-disks and 15" indicates a keyslot formed in the shaft. 18 indicates a key seated in said slot 15" and engaging with a slot 16' in the disk 16.

19 indicates a key-retaining nut screwed on the thread 15'. It will be apparent that when the nut is loosened and the key removed the disk 16 may be advanced or retracted upon the shaft 15 by rotating it relative to the shaft to properly adjust the position of said disk and that the parts may be then secured in immovable relation by the proper interposition of the key 18 and its lock-nut 19.

20 and 21 indicate two opposing driving-shafts arranged in generally coaxial relation, a portion of each of said shafts lying between the driving-disks 16 and 17 being bodily movable transversely of said shaft or longitudinally of the machine, as hereinafter more fully described.

22 and 23 indicate driving-wheels slidably mounted upon shafts 20 and 21, respectively, and adapted to be simultaneously brought into contact with the opposite driving-disks by the shifting of the driven shafts in opposite directions.

In the specific construction herein shown we have illustrated the shafts 20 and 21 as pivoted on a vertical axis at their outer ends and laterally movable at their inner adjoining ends and means for simultaneously moving said adjoining ends in opposite directions.

Specifically, 24 and 24' indicate brackets suitably secured to the side pieces of the frame 10 and associated with the shafts 20 and 21, respectively. As the mechanisms connected with both of these brackets are exactly alike, we will particularly describe only that associated with bracket 24, it being understood that similar parts are found associated with the bracket 24', parts associated with bracket 24' being indicated by the same numerals as like parts in the bracket 24, but differentiated by the exponent-mark prime, ('.) The bracket 24 is so shaped as to afford two vertically-alining separated supports 24ª 24ª and a connecting portion 25, perforated, as at 26, for the passage of the shaft 20.

27 indicates generally a combined bearing member and gear-casing pivoted in the bracket 24 to turn about a vertical axis. Preferably, for convenience, the said casing is made in two pieces, as indicated in Fig. 6; but its essential is that it be generally so shaped as to afford a suitable bearing for the shaft 20 and a chamber 28 for a gear member.

29 29 indicate opposing pivot-studs projecting vertically upward and downward from the member 27 and each screw-threaded, as indicated. 31 31 indicate adjusting-nuts threaded upon said studs and bearing against the top and bottom surfaces, respectively, of the two supporting bracket members 24ª. Suitable check-nuts 32 are preferably also employed to lock the adjusting-nuts 31 in set position. It will be apparent that by the arrangement described vertical adjustability of the bearing member is secured for the purpose of properly alining the shaft.

33 indicates a skirt of the gear-casing, which may be omitted, if desired.

Referring now particularly to Figs. 5 and 6, wherein is illustrated in enlarged detail the mechanism for supporting and adjusting the inner ends of the shafts 20 and 21, 34 indicates generally a split bearing-box divided longitudinally with reference to the shaft 15 into two relatively slidable sections and having its two sections arranged jointly to completely encircle said shaft to loosely bear thereon. One section 35 of the box 34, associated with the shaft 20, is provided with a longitudinally-extending guiding-flange 36 along each of its upper and lower sides. The opposite box member 35' is provided with a coacting grooved flange 37, adapted to form a guide for the flange 36 of the said box member. 38 indicates a vertically-disposed bearing-sleeve, preferably formed integrally with the box member 35' and arranged to afford a bearing for a vertical actuating-shaft 39. 40 indicates a series of gear-teeth provided on or cut into the shaft 39 and arranged to coact with corresponding teeth 41 of the box member 35. As the parts thus geared together have very slight relative movement in practice, but very few teeth are necessary to secure the results desired. The shafts 20 and 21, respectively, are journaled in the box members 35 and 35' for movement therewith longitudinally of the driving-shaft 15 or transversely of the said driven shafts 20 and 21. As the association of both of the shafts with their corresponding box members are alike, we will describe only the connection of the shaft 20 with its box member 35, it being understood that like parts as those described are found associated with the opposite shaft and are indicated by like numerals of reference differentiated by the exponent prime, ('.) 42 indicates a recess made transversely into the box member 35, substantially in the same plane with the axis of the shaft 15. 43 indicates a sleeve wherein the shaft 20 is journaled for rotation, said sleeve being of somewhat less diameter than the recess 42 and arranged therein. 44 44 indicate vertically-extending pivot-pins projecting above and below the bearing-sleeve 43 and preferably formed integrally therewith. Each of said pins 44 is screw-threaded at its outer end to receive an adjusting-nut 45. 46 46 indicate check-nuts adapted to lock the adjusting-nuts 45. It will be apparent that by suitable adjustment of the nuts 44 the sleeve 43, and consequently the inner end of the shaft 20, may be vertically moved to secure and maintain the shaft 20 with its axis in the horizontal plane including the axis of the shaft 15. It will be apparent now that if the actuating-shafts 39 be rotated the positive engagement of said shaft with the sleeve 38 of the box member 35' and its gearing engagement with the box member 35 will cause said box members to be simultaneously moved longitudinally of the shaft 15 in opposite directions. Means for effecting such operation of the shaft 39 are provided, such means being herein indicated, as follows: 47 indicates a sprocket-wheel fixedly secured, as by a key 48, to the shaft 39 at a level above the top of the driving-wheel 16. 49 indicates a companion sprocket-wheel connected with the sprocket 47 by a chain 50 and associated for manipulation with the hand-wheel 51. It will be apparent now that if the hand-wheel 51 be rotated to transmit rotary motion through its chain connection to the actuating-shaft 39 the box members 35 and 35' will be relatively moved, as described, in their movement bodily shifting the shafts 20 and 21 in opposite directions to bring the driven wheels 22 and 23 carried thereby, respectively, into operative friction contact with the driving-disks 16 and 17. It will be apparent that by turning the wheel 51 in one direction the wheel 22 will be moved into contact with disk 16, wheel 23 simultaneously making contact with the opposite disk 17, and that by turning the wheel 51 in the other direction the respective wheels will be moved into contact with the respectively opposite disks, so that when in operation the opposite wheels always contact with the respectively opposite disks on opposite sides of the driving-shaft.

Means are also provided in our device for simultaneously moving the driven wheels upon their shafts radially across the face of the driving-disks, such means being herein indicated, as follows: 52 is a slot cut longitudinally of the shaft 20 to receive a feather carried by the driven wheel 22 to secure said wheel against rotation relative to the driven shaft, while permitting it to slide longitudinally on said shaft, as will be well understood. 53 indicates a yoke operatively associated with the wheel 22 to permit the same to rotate relative thereto, but to be capable of moving said wheel longitudinally, as will be well understood. 54 indicates a transversely-disposed rack suitably supported and guided in a plane above the tops of the driven wheels 22 and 23 and fixedly connected with the yoke 53 in any preferred manner. These parts are well known in the art and are believed to need no detailed description. Similar devices are associated with the wheel 23 to move the latter, like parts being indicated by the same numerals as the parts just described, but differentiated by the exponent character prime, ('.) The two rack members 54 and 54' are arranged face to face and are suitably separated. 55 indicates a sprocket-wheel carried by a sleeve 56, mounted for rotation upon the shaft 39 and interposed between and in engagement with said racks 54 and 54'. 57 indicates a sprocket-wheel affixed to the sleeve 56 at a level above the top of the driving-disk 16 and connected by a chain 58 with an operating sprocket-wheel 59, operatively associated with the hand-wheel 60.

The hand-wheels 51 and 60, heretofore described, and their respective sprocket-wheels 49 and 59 may be arranged upon two separate and independently-rotatable sleeves concentrically mounted upon a shaft 61, having fixedly secured to the upper end thereof a hand-wheel 62 and connected at its lower end by any suitable mechanism (generally indicated at 63) with the steering-gear. Such an arrangement, however, forms no part of our present invention, and any means for independently operating the steering mechanism, the mechanism for axially moving the driven wheels, and the mechanism for bodily moving the driven shafts may be employed without departing from our invention.

While we have described the box member 35', carrying the shaft 39, as movable longitudinally of the driving-shaft 15 and have also described a permanent connection between a sleeve 56, carried by said shaft 39, and the laterally-immovable rack 54, it will be understood that in practice the amount of relative play of the two box members 35 and 35' necessary to effect the shifting of the driven wheels from engagement with their respective driving-disks to engage with the respective opposite disks is very slight, so that the lost motion and play of the gears and sprockets and their chains is sufficient to permit the device to be constructed as heretofore described without the use of springs or other means for yieldingly holding the racks 54 in engagement with their sprockets.

It will be apparent that in the operation of our mechanism the loose connection of the box 34 with the shaft 15 enables it to assume such position as may be necessary to cause the friction-driven wheels to exactly balance in their pressure on their respective coacting disks. Thus it will now be apparent that as the pressure of the driving-wheel 22 against whichever of the driving-disks 16 or 17 it is thrown into contact with is exactly counterbalanced by the opposing pressure of the opposite wheel 23 against the opposite friction-disk the shaft 15 receives no end thrust in either direction, and this source of considerable loss of power is eliminated. It will also be apparent that as with whichever of the driving-disks the wheel 22 engages the wheel 23 engages with the opposite side of the confronting disk the shafts 20 and 21 always receive rotation in the same direction. Consequently both shafts 20 and 21 may be directly connected with their respective traction-wheels, and both will drive in the same direction. In the drawings we have illustrated such connection as made from the shaft 20 by a sprocket-wheel 64, mounted on said shaft in the recess 28 of the gear-casing and connected by a driven chain 65 with the gear 66, fixedly mounted on the wheel 12. Like parts indicated by like numerals of reference differentiated by the exponent prime (') are provided to connect the shaft 21 with the traction-wheel 12'.

While we have herein set forth in some detail an advantageous embodiment of our invention in an automobile structure, we do not desire to be understood as limiting ourselves to its use in such environment or to the particular construction shown in all of its details, as it will be apparent to those skilled in the art that the invention is capable of wide application and that numerous changes in the specific structure might be made without departing from the spirit and scope of our invention.

Having described our invention, what we claim, and desire to secure by Letters Patent of the United States, is—

1. In a frictional power-transmitting device, a driving-shaft, two confronting driving-disks thereon, two driven shafts disposed transversely to the driving-shaft, a driven wheel carried by each of said driven shafts, means for moving said driven shafts transversely in opposite directions to bring the opposite driven wheels into contact with the opposite driving-disks.

2. In a frictional power-transmitting device, a driving-shaft, two separated, confronting driving-disks thereon, two driven shafts disposed transversely of the driving-shaft on opposite sides thereof, a friction-driven wheel carried by each of said driven shafts between the driving-disks, and means for moving said driven wheels simultaneously in opposite directions into contact with the opposite driving-disks.

3. In a frictional power-transmitting device, a driving-shaft, two confronting driving-disks secured thereto, two driven shafts disposed transversely of the driving-shaft, a driven wheel carried by each of said driven shafts disposed between the driving-disks, and means for laterally moving the adjacent ends of said driven shafts in opposite directions to bring the opposite driven wheels into contact with the opposite driving-disks.

4. In a frictional power-transmitting device, a driving-shaft, a driving-disk mounted thereon, two driven shafts disposed on opposite sides of the driving-shaft, a driven wheel carried by each of said driven shafts, and means for simultaneously moving the corresponding ends of said driven shafts in opposite directions to move one of said driven wheels into contact with the driving-disk, and remove the opposite driven wheel from said driving-disk.

5. In a frictional power-transmitting device, a driving-shaft, two confronting driving-disks thereon, two driven shafts transversely disposed relative to the driving-shaft on opposite sides thereof, a box structure loosely mounted on the driving-shaft and comprising two members relatively movable longitudinally of the driving-shaft, and each affording a bearing for the inner end of one of the driven shafts, and means for moving said movable box members in opposite directions to bring the driven wheels into contact with the driving-disks with equal pressure.

6. In a frictional power-transmitting device, a driving-shaft, two parallel confronting driving-wheels thereon, two driven shafts disposed transversely of the driving-shaft on opposite sides thereof, a driven wheel carried by each of said driven shafts, a pivotal bearing for one end of each of said driven shafts, a movable bearing for the opposite end of each of said driven shafts, and means for simultaneously moving said movable shaft-bearings in opposite directions to bring the opposite driven wheels into contact with the driving-disk.

7. In a frictional power-transmitting device, a driving-shaft, two parallel confronting driving-disks thereon, two driven shafts disposed transversely of the driving-shaft on opposite sides thereof, and in a common plane therewith, a driven wheel carried by each of said driven shafts, a bearing pivoted to turn on an axis transverse to the common plane of the shafts at the outer end of each of said driven shafts, a bearing member carried by the driving-shaft and having two relatively movable parts, one arranged to afford bearing to the inner end of each of the driven shafts, and means for simultaneously moving said movable parts of the bearing member in opposite directions to bring the opposite driven wheels into contact with the opposite driving-disks.

8. In a frictional power-transmitting device, a driving-shaft, two confronting driving-disks carried thereby, two driven shafts arranged transversely of the driving-shaft on opposite sides thereof in a common plane therewith, a driven wheel carried by each of said driven shafts, a bearing for the outer end of each of said driven shafts, arranged to permit slight oscillating movement about an axis transverse to the plane of the shaft-axes, a split bearing-box surrounding the driving-shaft having two independently-movable members each arranged to afford bearing to the inner end of one of the driven shafts, and means for simultaneously moving the box-sections in opposite directions to bring the opposite driven wheels into contact with the opposite driving-disks.

9. In a frictional power-transmitting device, a driving-shaft, two confronting driving-disks thereon, two driven shafts disposed transversely to the driving-shaft, a friction-driven wheel carried by each of said driven shafts, vertically-adjustable bearings for the outer and inner ends of each of said shafts, one of said bearings for each shaft being arranged to permit slight pivotal play of the shaft about an axis transverse to the plane of the shafts, and means for moving the other shaft-bearings simultaneously in opposite directions, to bring the opposite driven wheels into contact with the opposite driving-disks.

10. In a frictional power-transmitting device, a driving-shaft, two confronting driving-disks carried by said shaft, one of said driving-disks being adjustable longitudinally of the shaft, two driven shafts arranged in a common plane with the driving-shafts and disposed transversely relative thereto on opposite sides thereof, a friction-driven wheel carried by each of said driven shafts, and means for moving said driven shafts in opposite directions to bring the opposite driven wheels into contact with the opposite driving-disks.

In testimony that we claim the foregoing as our own we affix our signatures in presence of two witnesses.

WILLIAM O. WORTH.
JOHN D. WORTH.

In presence of—
 FORÉE BAIN,
 MARY F. ALLEN.